Nov. 20, 1923.  
E. W. DAY  
1,474,816  
LUMINOUS INDICATOR  
Filed Aug. 23, 1917   2 Sheets-Sheet 1
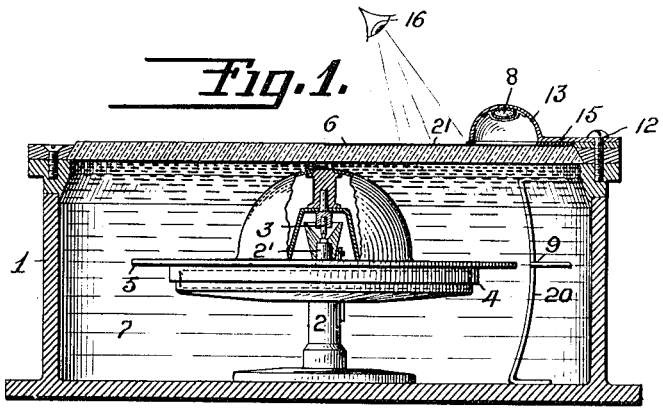
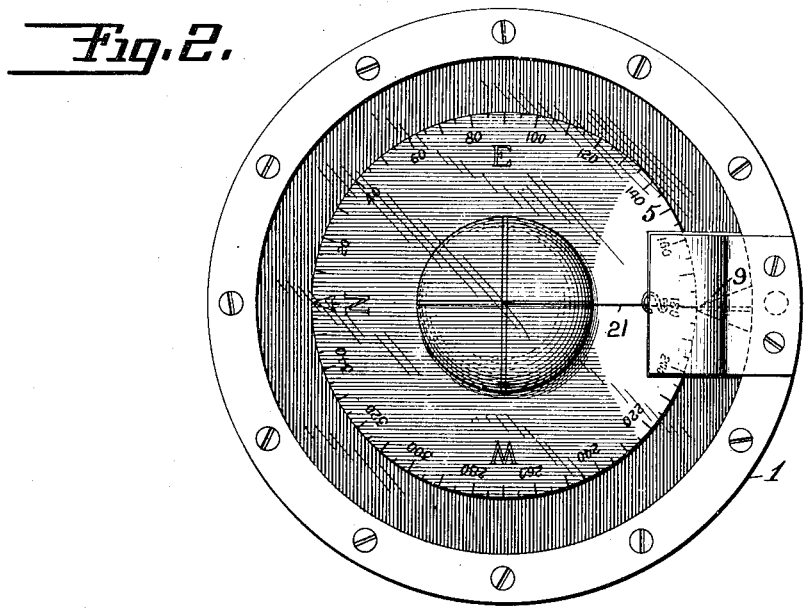
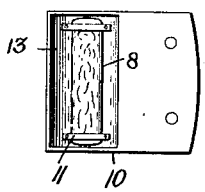 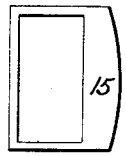
INVENTOR  
EDWIN W. DAY.  
BY  
Herbert H. Thompson,  
ATTORNEY.

Nov. 20, 1923. 1,474,816
E. W. DAY
LUMINOUS INDICATOR
Filed Aug. 23, 1917  2 Sheets-Sheet 2
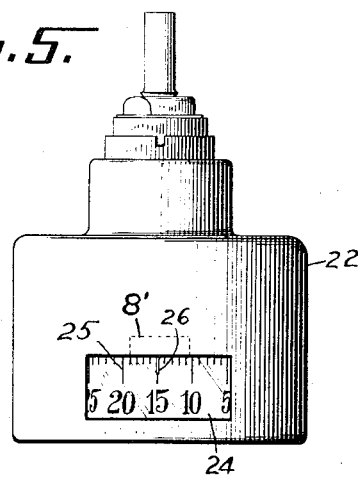
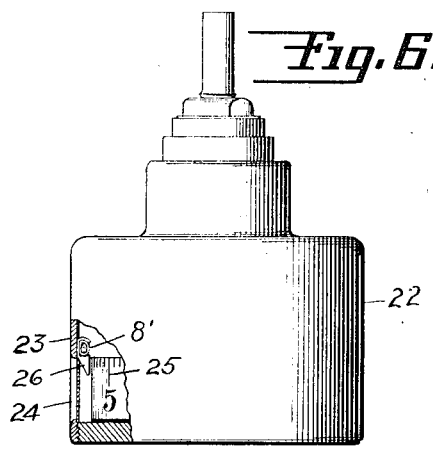
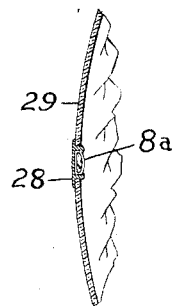
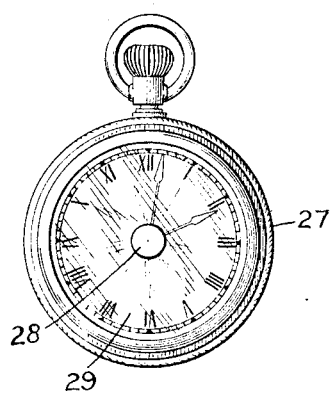
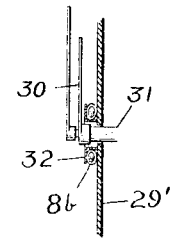
INVENTOR
EDWIN W. DAY.
BY
Herbert H. Thompson
ATTORNEY Patented Nov. 20, 1923.

1,474,816

UNITED STATES PATENT OFFICE.

EDWIN W. DAY, OF BROOKLYN, NEW YORK.

LUMINOUS INDICATOR.

Application filed August 23, 1917. Serial No. 187,913.

*To all whom it may concern:*

Be it known that I, EDWIN W. DAY, a citizen of the United States of America, residing at 273 89th St., Brooklyn, in the county of Kings and State of New York, have invented certain new and useful Improvements in Luminous Indicators, of which the following is a specification.

This invention relates to visual indicating devices or in other words to indicators of the kind which must be seen to be read.

The main object of the invention is to construct such indicators so that they may be read with facility not only in the day light or when illuminated by artificial means but also in the dark. For this purpose I prefer to make use of a radio-active substance or substances so situated as to illuminate that part of the indicator which it is most essential to see.

My invention is especially adapted for compasses such as used by aviators and soldiers. I am aware that it has been proposed to use radium paint in marking compass dials, whereby the dials themselves are rendered self-luminous, but it has been found objectionable for several reasons. A comparatively large amount of radium is required to paint all of the compass markings and the lubber line so that the cost of constructing compasses in this manner is necessarily high. Furthermore, the liquid, such as alcohol, with which it is found desirable to fill compasses, very often seriously damages the radium paint and causes rapid deterioration thereof. In my invention this objection to the use of radium is over-come and the cost of the compass greatly reduced. Also a much better, and therefore a more costly grade of material is necessary where the material is used in a liquid than where it is dry so that here too, the cost of the instrument is reduced by using my method of illumination.

When the luminous material is applied directly to the markings or hands of instruments in the form of a paint or paste, the small particles of radio-sensitive substance upon which the radium rays must act to produce light become affected by the air, and gradually lose their value. One of the advantages of placing the material in an air tight tube is therefore obvious.

Referring to the drawings:

Fig. 1 is a vertical section of a compass.
Fig. 2 is a plan view thereof.
Fig. 3 is a bottom plan view of the radium lamp and casing.
Fig. 4 is a detail of a washer used to keep water out of the lamp.
Fig. 5 is a front elevation of a speedometer showing the application of my invention thereto.
Fig. 6 is a side elevation thereof partly in section.
Fig. 7 shows the application of the invention to a watch.
Fig. 8 is a detail of Fig. 7.
Fig. 9 shows a modified method of applying the invention to a watch.

The compass casing is indicated at 1. From the bottom thereof rises the post 2 on the top 2' of which a pin 3 rests. The said pin serves to rotatably support the magnetic element or elements 4 to which is secured the compass rose or a card 5. The reference index 9 is shown as supported on a wire 20.

The casing is shown as provided with a glass top 6 and is designed to be completely filled with a limpid, clear liquid 7 such as alcohol.

According to my invention I concentrate the radio active substances which have heretofore been spread over the entire compass card in a small tube or container 8 which is secured near the reference index or lubber line 9 so as to illuminate the same and the adjacent portions of the card 5. The said radio active substance is preferably placed within the tube in a dry or powdered form and consists preferably of a mixture of a radio-active salt and a finely divided fluorescent substance such as zinc sulphide. By using these substances in a dry or powder form a greater light emissivity is obtained than when applied in the form of a paste or paint on the compass markings, since certain rays probably principally the "α" rays are largely absorbed thereby. The said container 8 is preferably secured or clamped to member 10 by means of strips 11 and is preferably flattened in the direction in which the rays are projected, as shown in Figs. 1 and 3. By this construction a greatly increased radiation is secured in the desired direction as compared to a cylindrical tube with a round bore with the same cubical contents since a greater surface of radio-active material is presented. The said member 10 is shown as detachably fastened to the compass casing by set screws 12 adjacent or above the lubber line 9. At the point where the container 8 is secured thereto, member 10 is preferably made concave on its under surface as shown at 13, so as to act in effect as a reflector for the radium rays. Preferably the under surface of said concave portion is coated with a substance which is fluorescent in the presence of radium, such as a paint or paste or finely divided zinc sulphide. Member 10 will then produce a material increase in the quantity of light thrown upon the compass card.

The container or tube 8 is preferably made of glass and sealed at both ends so that the radium is protected from the action of moisture or foreign substances. The under surface 13 of member 10 may also be protected from moisture by a rubber gasket 15 (see Fig. 4). While in Figs. 1 and 2 the container and reflector are shown as placed directly over the card and lubber line in order to obtain maximum illumination, they do not interfere with the observer in this position as is shown by the position of the observer's eye 16 in Fig. 1.

In Figs. 5 and 6 I have shown my invention applied to an automobile speedometer 22, in which instance the tube 8' containing the radio-active substance may be attached to the inside of the speedometer case 23 directly over the window 24 through which the observer reads the markings 25, and back of the lubber line 26.

Figs. 7 and 8 show the application of the invention to a watch 27. A glass bulb 8a containing the radio-active substance is shown within a metal casing 28 inserted in a hole in the center of crystal 29.

The radiation from this point will illuminate the entire dial and also show the position of the hands.

In Fig. 9, I show a tube 8b of radio-active substance below the hands 30 of the watch. The tube may rest on the dial 29' and surround stem 31. A shield 32 over the tube 8b may while serving to hold said tube in place, also prevent the direct emanation from reaching the eye of the observer, so that the eye may be more sensitive to the light reflected from the dial.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. It is obvious that the position of the radium may be varied within the scope of my invention. Also the application of my invention to other types of indicators will be obvious from the foregoing description.

Having described my invention what I claim and desire to secure by Letters Patent is:

1. In a compass, the combination with a casing, of a compass rose pivotally supported therein, a reference index therefor, a self luminous lamp supported on said casing at a distance from said rose and said index and adapted to illuminate the index and adjacent portions of the rose, said lamp comprising a glass tube having a bore and a luminous compound sealed in said bore.

2. In a visual indicator, the combination with a rotatable indicating element and a stationary indicating element adapted for conjoint reading, a radio-active substance supported to one side of said elements, and fluorescent means on the side of said radium opposite from said elements for increasing the illumination of said elements.

3. In a visual indicator, the combination with a rotatable indicating element and a stationary indicating element adapted for conjoint reading, a radio-active substance and a container therefor, and a concave fluorescent holder for said container positioned adjacent said elements.

4. In a compass, the combination with a casing, of a compass rose pivotally supported therein, a reference index therefor, a holder supported to one side of said index, and having a fluorescent inner surface, and a radio-active substance supported thereby.

5. As an article of manufacture, a glass tube having a flattened bore and a finely divided mixture in a dry state of a radio-active material and a fluorescent material sealed in said bore.

6. In a visual indicator, the combination with a rotatable indicating element and a stationary indicating element adapted for conjoint reading, of a transparent tube having a flattened bore and luminous material in said bore, and means for supporting said tube in position for illuminating said stationary element and the adjacent portion of said rotatable element.

7. In a visual indicator, a stationary indicating element, a rotatable indicating element adapted to cooperate therewith, a transparent container having a flattened bore and mounted adjacent said elements, luminous material sealed in said bore, and means for shielding said luminous material from direct view.

8. In a visual indicator, a stationary indicating element and a rotatable indicating element adapted for conjoint reading, a transparent container having a flattened bore and a radio-active substance sealed in said bore, and a concave fluorescent holder for said container positioned adjacent said elements.

9. In a visual indicator, a stationary indicating element and a rotatable indicating element adapted for conjoint reading, a transparent container adjacent said elements, luminous material in said container, and a concave member adjacent said container for shielding said material from direct view, said concave member having a fluorescent inner surface positioned for directing light toward said indicating elements.

In testimony whereof I have affixed my signature.

EDWIN W. DAY.